(12) United States Patent
Egle et al.

(10) Patent No.: US 8,036,809 B2
(45) Date of Patent: Oct. 11, 2011

(54) ENGINE SYNCHRONIZER

(75) Inventors: Lawrence E. Egle, Sarasota, FL (US); Aaron S. Dickey, Sarasota, FL (US)

(73) Assignee: Evoke Technology LLC, Sarasota, FL (US)

( * ) Notice: Subject to any disclaimer, the term of this patent is extended or adjusted under 35 U.S.C. 154(b) by 522 days.

(21) Appl. No.: 12/148,315

(22) Filed: Apr. 18, 2008

(65) Prior Publication Data

US 2008/0314175 A1 Dec. 25, 2008

Related U.S. Application Data

(60) Provisional application No. 60/912,518, filed on Apr. 18, 2007.

(51) Int. Cl.
*G06F 19/00* (2006.01)
*F02D 11/10* (2006.01)
*F02D 9/10* (2006.01)
*F02B 73/00* (2006.01)

(52) U.S. Cl. ........ 701/103; 123/336; 123/399; 123/400; 123/403; 123/442; 60/700; 60/702

(58) Field of Classification Search .................. 123/336, 123/342, 350, 352, 361, 396, 399, 403, 400, 123/442; 701/101–103, 110, 114, 115; 60/700–702; 440/1, 84, 87
See application file for complete search history.

(56) References Cited

U.S. PATENT DOCUMENTS

| 3,258,927 | A | * | 7/1966 | Herbert | 60/700 |
| 3,367,110 | A | * | 2/1968 | Leeson, Jr. | 60/702 |
| 3,986,363 | A | * | 10/1976 | Beaman et al. | 60/700 |
| 4,435,961 | A | * | 3/1984 | Stewart | 60/719 |
| 4,479,357 | A | * | 10/1984 | Stewart | 60/719 |
| 4,586,341 | A | * | 5/1986 | Kobus | 60/702 |
| 4,741,165 | A | * | 5/1988 | Kobus | 60/700 |
| 4,964,276 | A | * | 10/1990 | Sturdy | 60/700 |
| 7,530,865 | B2 | * | 5/2009 | Kado et al. | 440/1 |

* cited by examiner

*Primary Examiner* — Willis Wolfe, Jr.
(74) *Attorney, Agent, or Firm* — Carlton Fields, P.A.; William Giltinan

(57) ABSTRACT

Engine synchronization apparatus and system for multi-engine vehicles such as boats and aircraft providing limited authority throttle cable trim effected by an apparatus interposed between the throttle plate and throttle cable of a slave engine and mounted in a floating configuration. An actuator is mounted to the apparatus to trim the distance between the throttle plate and throttle cable attachment thereby trimming the throttle cable. A system is provided in which a difference signal derived from master and slave engine tachometer signals is used to control the actuator and synchronize the engines within a predetermined range.

13 Claims, 5 Drawing Sheets

ENGINE SYNCHRONIZER

CROSS-REFERENCE

The present application claims priority from U.S. Provisional Patent Application No. 60/912,518 filed Apr. 18, 2007, the contents of which are hereby incorporated in their entirety by reference, and which is not admitted to be prior art by its mention in the background.

FIELD OF THE INVENTION

The present invention relates to engine synchronization in multiple engine vessels.

BACKGROUND

It is common in many vehicle applications to use two or more engines, for example in multi-engine boats and airplanes. Multiple engines are most effective when the engine speeds (rpm) are synchronized. If the engines are not synchronized, a noticeable and irritating beat frequency is generated. Operating multiple engines in a non-synchronized mode forces one engine to work harder than the other, which reduces overall efficiency and may lead to premature failure of the vessel structure.

Modern multiple engine boats and aircraft often include expensive synchronization features using various technologies, including, for example, hydraulic power, servo motors, fuel supply control, computerized operation, and drive-by-wire devices.

For obvious safety reasons, synchronization devices require safe failure modes, whereby in the event of failure of the device, the engines remain operable. Further, marine devices must be robust and corrosion resistant to perform reliably in a salt-water environment. A desirable design feature is permits an operator to manually override synchronization, for example when different engine speeds are required for low-speed maneuvers such as docking. This may be achieved, for example, by restricting synchronization to the condition where the engine speeds are within a predetermined range.

As a result of these and other design considerations, the devices of the prior art are generally complex, expensive, bulky, and the cost of installation can be significant due to the requirement for skilled labor and expensive materials. This places most such systems out of the reach of the common boat owner or aircraft owner.

Information relevant to attempts to address these problems can be found, for example, in U.S. Pat. Nos. 5,222,901; 5,142,473; 4,718,869; 5,741,166; 6,414,607; 6,233,943; 6,485,340; 6,587,765; 6,611,748; 6,694,741; 6,751,533; 6,840,888; 6,965,817; 7,121,908; and 7,142,955. However, each one of these references suffers from one or more of the following disadvantages: the devices comprise many parts, increasing the risk of component failure and the cost of manufacture; the devices are of large size, taking up valuable boat or aircraft space; and/or the devices are complex, making installation and maintenance a skilled operation that may be difficult and expensive.

For at least the foregoing reasons, there is a need for a small, low cost, low component count, easily installed and maintained engine synchronizer suitable as original equipment or for retrofitting to multi-engine vehicles such as boats or aircraft, and for OEM applications.

SUMMARY

The present invention is directed to an apparatus and system that satisfies the aforementioned needs and more. An apparatus having features of the present invention has an actuator comprising a motor assembly and a shaft. The motor assembly is capable of displacing the shaft along its axis and is attached to, or is integral with, an elongate bracket extending from the motor assembly and disposed substantially adjacent to the axis of the shaft. The distal end of the bracket has a mounting, for example a throttle cable tube, for securing one end of a throttle cable or the like. The bracket further has an elongate aperture that extends substantially parallel and adjacent to the axis of the shaft. A coupling, such as a bolt, is mounted to the distal end of the shaft and extends through the aperture to engage a throttle plate, whereby the apparatus is mounted in a novel floating configuration.

In another aspect, the present invention is directed to an apparatus for synchronizing the rotational speeds of a master engine and one or more slave engines. In this aspect, the engines each have rotational speed sensors such as tachometers, and the slave engine or engines each have a throttle plate and a throttle cable, or their equivalent, for controlling the rotational speed of the engine. In this aspect, the apparatus has a first means for operably attaching to the throttle cable of the slave engine and a second means for operably attaching to the throttle plate of the slave engine. The apparatus also has a means for comparing the rotational speeds of the master and slave engine or engines and for providing a difference signal. The apparatus is further provided with a means for adjusting the distance between the first and second means within predetermined limits to trim the throttle cable length in response to the difference signal. By these means the speed of the slave engine or engines is synchronized to the speed of the master engine.

In another aspect, the present invention is directed to a system for synchronizing the rotational speeds of engines of a multi-engine vehicle. A system having features of the present invention has a master engine and at least one slave engine mounted to the vehicle. Each engine has a rotational speed sensor, such as a tachometer. The slave engine or engines also have a throttle cable and a throttle plate, or their equivalent, for operating the engine, and an apparatus according to the present invention mounted to the throttle cable and the throttle plate. The system has a controller, such as an electronic controller, for comparing the output of the master engine sensor and the outputs of the sensors of the slave engine or engines. The controller generates a difference signal that is used for controlling the motor assembly of each slave engine apparatus within predetermined limits, whereby the rotational speed of each slave engine is synchronized to the rotational speed of the master engine when the rotational speeds of said master and slave engines are within a predetermined speed range.

It is a feature of the present invention that a cable length trim function, or its equivalent, is provided. In a preferred apparatus of the present invention, the actuator is mounted to the throttle plate in a unique floating configuration, whereby operation of the actuator effectively trims motor speed as described herein.

In certain embodiments, the controller of the instant system is a control board with a microcontroller. In such embodiments, the control board receives filtered signals from the tachometer and counts the difference in pulses between the master and slave engines. The pulse information is electronically processed to provide a signal for controlled movement of the linear actuator and thereby the trim of the throttle cable and engine rpm.

It is another feature of certain embodiments of the present invention that the apparatus provides only limited authority of approximately 20% of the throttle stroke. The device is preferably configured to operate only when turned on by the operator and is preferably configured to turn off at low rpm when synchronization is not necessary, for example during docking maneuvers.

It is another feature of the present invention that it provides for easy installation and for a fail safe mode. A catastrophic and unlikely failure of the apparatus or system will not render a vessel inoperable, which is a requirement for marine vessels and aircraft.

The present invention can be used in any multi-engine vessel, aircraft, or device where the slave engine control consists, in whole or in part, of a cable actuation or its equivalent.

It is therefore an object of the present invention to provide a small, low cost, low component count, easily installed and maintained engine synchronizer apparatus and system.

BRIEF DESCRIPTION OF THE DRAWINGS

These and other features, aspects, and advantages of the present invention will become better understood with regard to the following description, appended claims, and accompanying drawings where:

DETAILED DESCRIPTION

Certain exemplary but non-limiting embodiments of the present invention are now described for illustrative purposes only, with reference to the attached drawings.

As used herein, the term throttle refers without limitation to any mechanical device for controlling the operating speed of an engine. The term is expressly not limited to a device for speed control in engines in which speed is controlled by restricting air flow into a carburetor, but also encompasses, for example, levers for controlling fuel flow into a diesel or other fuel injected engine, or the like.

Likewise, as used herein, the term throttle plate is not limited to a plate operably connected to control airflow in a carburetor intake, but instead refers without limitation to any mechanical device, the displacement of which is used to control the operating speed of an engine.

Figure 1:
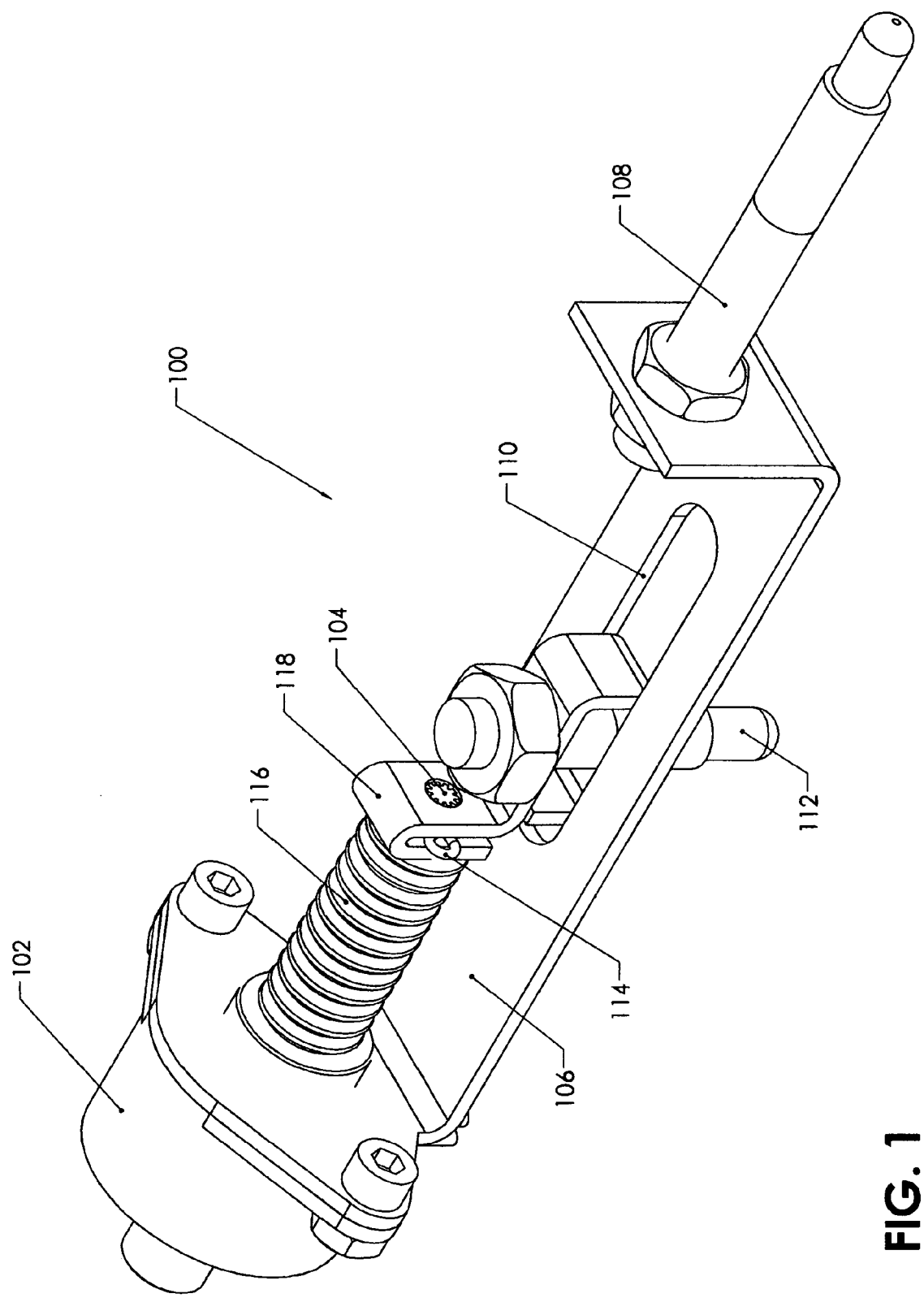
FIG. 1 is a perspective view of an engine synchronization apparatus according to one embodiment of the present invention.
Figure 2:
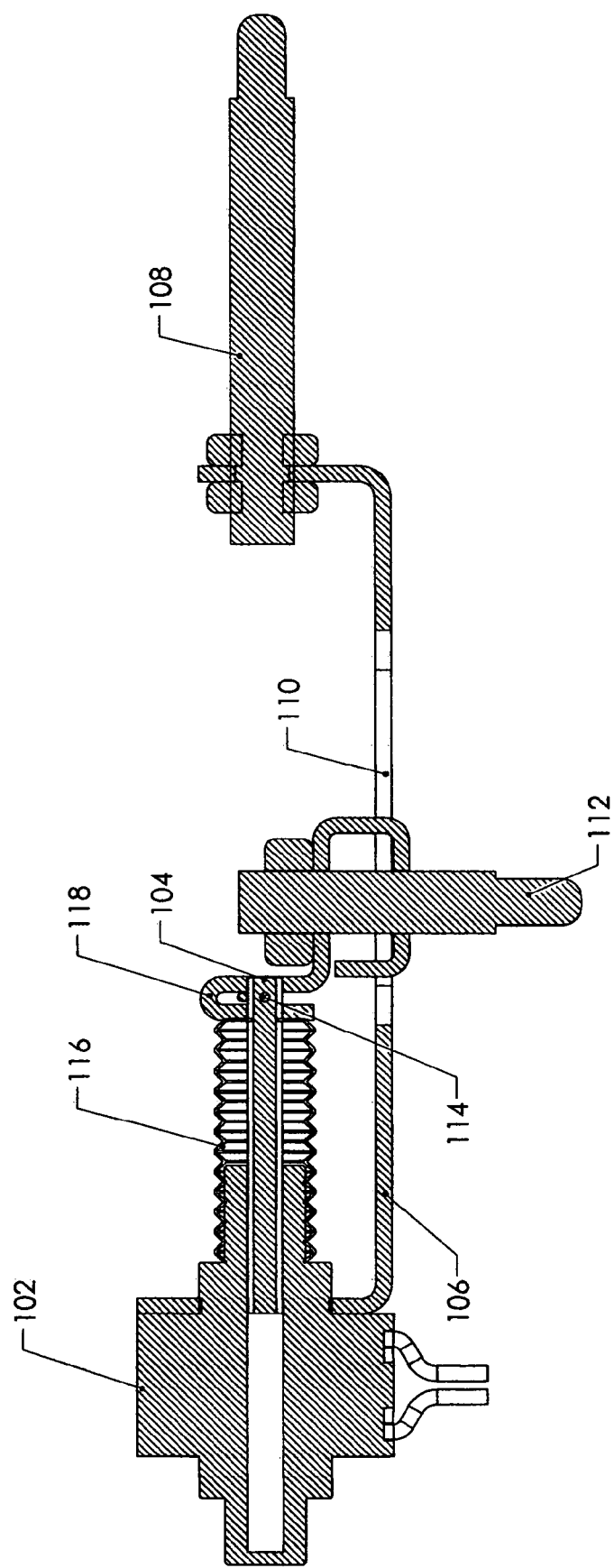
FIG. 2 is a longitudinal section of the apparatus of FIG. 1.

Referring now to FIGS. 1 and 2, an apparatus 100 according to the present invention comprises an actuator 102 comprising a motor assembly operably connected to shaft 104 and capable of displacing the shaft 104 along its axis. Optionally, shaft 104 is enclosed along its exposed length by an expandable, protective bellows 116. The actuator 102 is mounted to, or is integral with, actuator bracket 106, which extends substantially adjacent to the axis of shaft 104. The distal end of actuator bracket 106 comprises a means for securing one end of a throttle cable in the form of throttle cable shaft 108. Actuator bracket 106 comprises an elongate aperture 110 extending substantially adjacent and parallel to the axis of shaft 104. Coupling 112 is mounted to the distal end of shaft 104 by means of throttle tab 118, which is secured to shaft 104 by spring clip 114. Coupling 112 extends through aperture 110 to engage a throttle plate.

Actuator 102 can be any electromechanical, hydraulic, or pneumatic device capable of being operably mounted to shaft 104 to controllably displace the shaft along its axis. Pneumatic actuators comprising cylinders and valves are well known in the automotive, marine, and aeronautical arts, as are hydraulic actuators comprising piston, valves, and an incompressible fluid such as oil. In preferred embodiments the actuator comprises an electric motor, such as a brushless DC motor moving a shaft by a rack and pinion drive mechanism, or a proportional or short-stroke solenoid. Electrically activated compliant mechanisms can also be used. The actuator is the active device providing the cable length trim function to the apparatus and system of the present invention, and is most preferably a linear actuator such as is known in the automotive industry for use as an airflow control device for an automobile engine. The linear actuator comprises a stepper motor and a spline-equipped lead screw, herein termed a shaft. Rotation of the shaft extends and retracts it in a linear fashion, while the spline serves to prevent screw rotation. Optionally, a bellows 116 covers the exposed portion of the shaft and the motor is covered with a protective vinyl coating or similar to protect from environmental conditions.

Actuator bracket 106 can be mounted to the actuator 102 by screws, bolts, spot welding, or the like, or can be formed to be integral with the actuator body. When actuator 102 is activated, shaft 104 pushes or pulls upon the plate bolt coupling 112. Because plate bolt 112 is rigidly affixed to a throttle plate, bracket 106 pushes or pulls throttle cable shaft 108, which in turn trims the throttle cable.

Thus, it is a feature of the present invention that the actuator 102 is mounted in a novel floating configuration, which allows it to effectively trim motor speed. The floating configuration also provides for easy installation and for a fail safe mode. A catastrophic and unlikely failure of the synchronizer system will never render a vessel inoperable, which is an absolute requirement for marine products, as the throttle cable will remain operably connected to the throttle plate even if the actuator fails.

Bracket 106 is preferably a stamped sheet metal component of approximately $3/32$ thickness, although any suitably rigid, durable, and weather resistant material of suitable thickness can be used. Aperture 110 has a width that is selected to slidingly accommodate coupling 112 without excessive play. Preferably, the coupling extends lengthwise along a portion of the aperture to prevent twisting of the apparatus in use.

The length of aperture 110 is selected to provide a limited degree of trim authority whereby the apparatus can synchronize master and slave engines only if the difference in their engine speeds is within predetermined limits. This feature permits synchronization of the engines to be overridden by an operator by placing the respective throttle controls outside the predetermined range. For example, in preferred embodiments the aperture length can be selected to provide between about one-eighth and about one inch, or between about 5% and 30% of total throttle stroke. Most preferably, about 20% of total throttle stroke authority is provided.

The distal end of actuator bracket 106 comprises a means for securing one end of a throttle cable. Preferably, this means is in the form of throttle cable shaft 108 disposed coaxially with the actuator shaft, but any means known in the art for securing a throttle cable can be used, including but not limited to a bolted clamp securing the end of a throttle cable, or a slit retaining a broadened tip of a throttle cable.

Coupling 112 engages the throttle plate, and can be a bolt, pin, or other coupling capable of providing a secure and rigid attachment to the throttle plate and of mounting to the distal end of the shaft 104. In preferred embodiments, throttle tab 118 is secured to the distal end of shaft 104 by spring clip 114, and the tab 118 extends through aperture 110 and provides a support for throttle plate bolt. The throttle tab is preferably a stamped sheet metal component of approximately 3/32 thickness.

Figure 3:
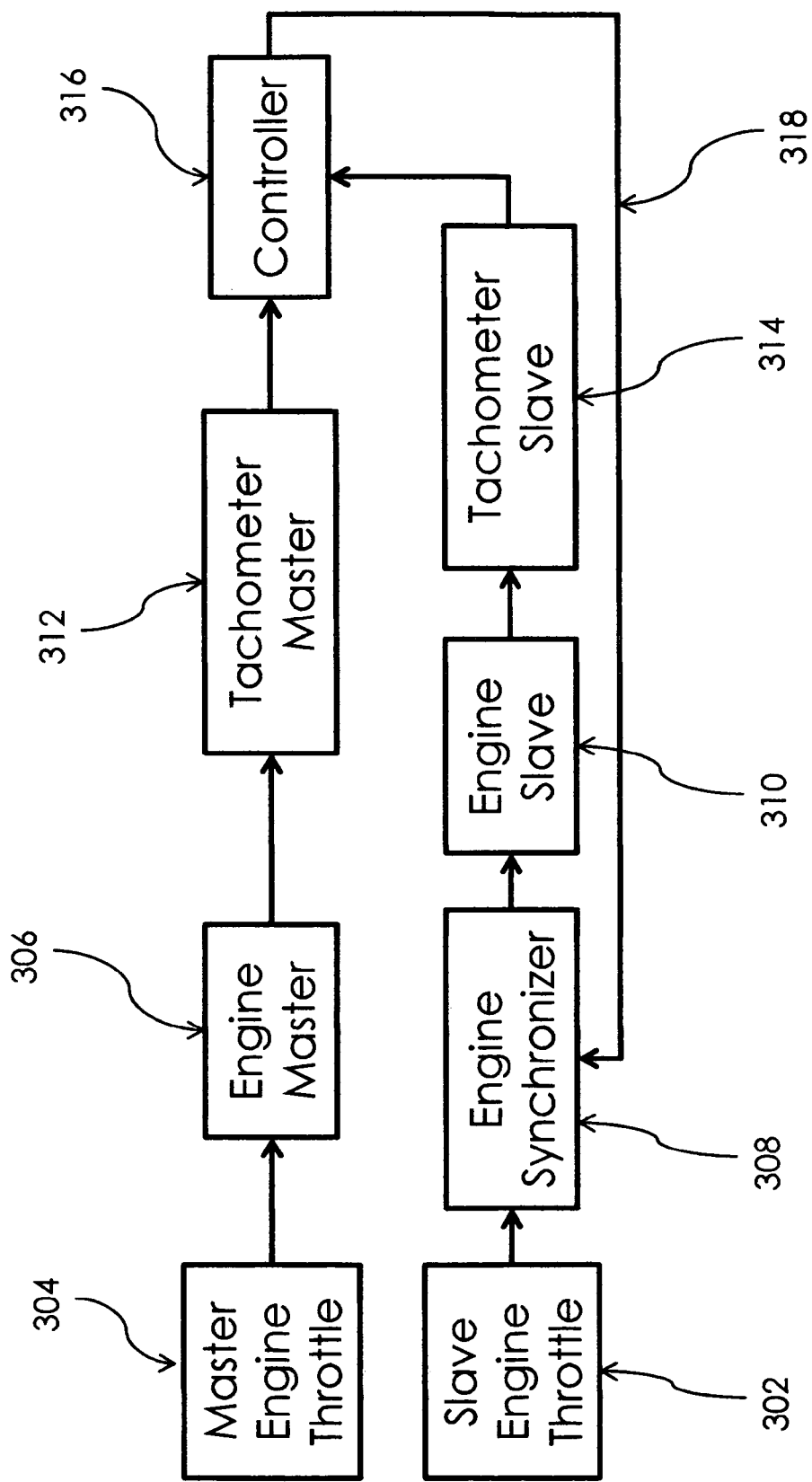
FIG. 3 is a schematic illustration of the operation of an engine synchronization system according to the present invention.

Referring now to FIG. 3, the operation of an engine synchronization system according to the present invention 300 is shown schematically. The master engine throttle 304 and slave engine throttle 302 are controlled by the vehicle operator. Slave engine throttle 302 is in series with engine synchronizer 308, which is an apparatus according to the present invention. Each said engine comprises an engine sensor, such as a tachometer or other device capable of providing a signal that can be used to determine the rotational speed of the engine. Continuous master tachometer 312 and slave tachometer 314 signals are produced from master engine 306 and slave engine 310, respectively, which are fed into controller 316. When the operator initiates synchronous control, controller 316 monitors master tachometer 312 and slave tachometer 314 signals. A difference in the signals indicates that the engines are operating at dissimilar engine speeds. The signals are processed by controller 316 to provide feedback signal 318, which is fed to engine synchronizer 308 to control operation of the actuator to trim the throttle cable of the slave engine 310 such that master engine 306 and slave engine 310 maintain the same engine speeds.

Figure 4A:
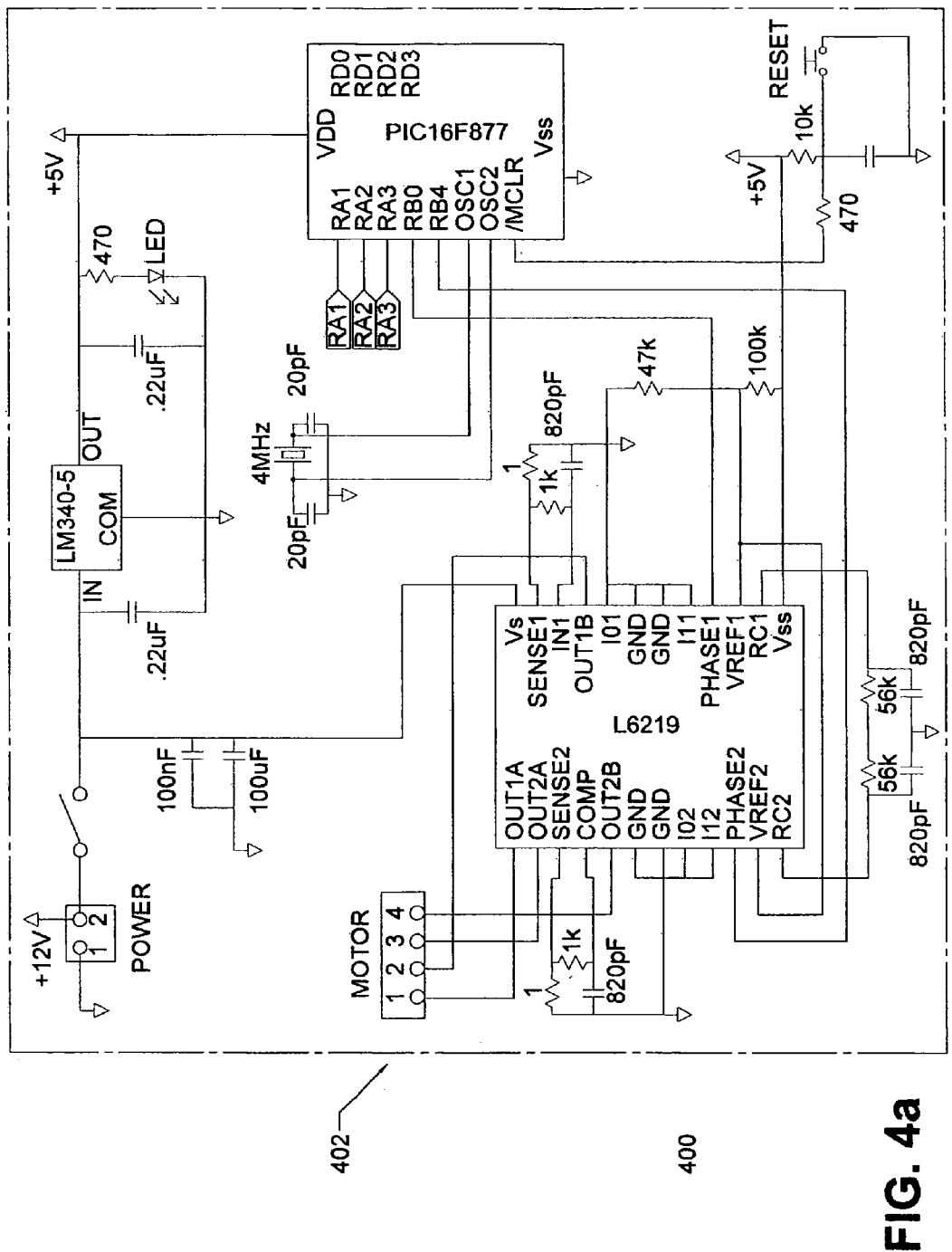
FIGS. 4a and 4b are a schematic circuit diagram for a controller of the system of FIG. 3.
Figure 4B:
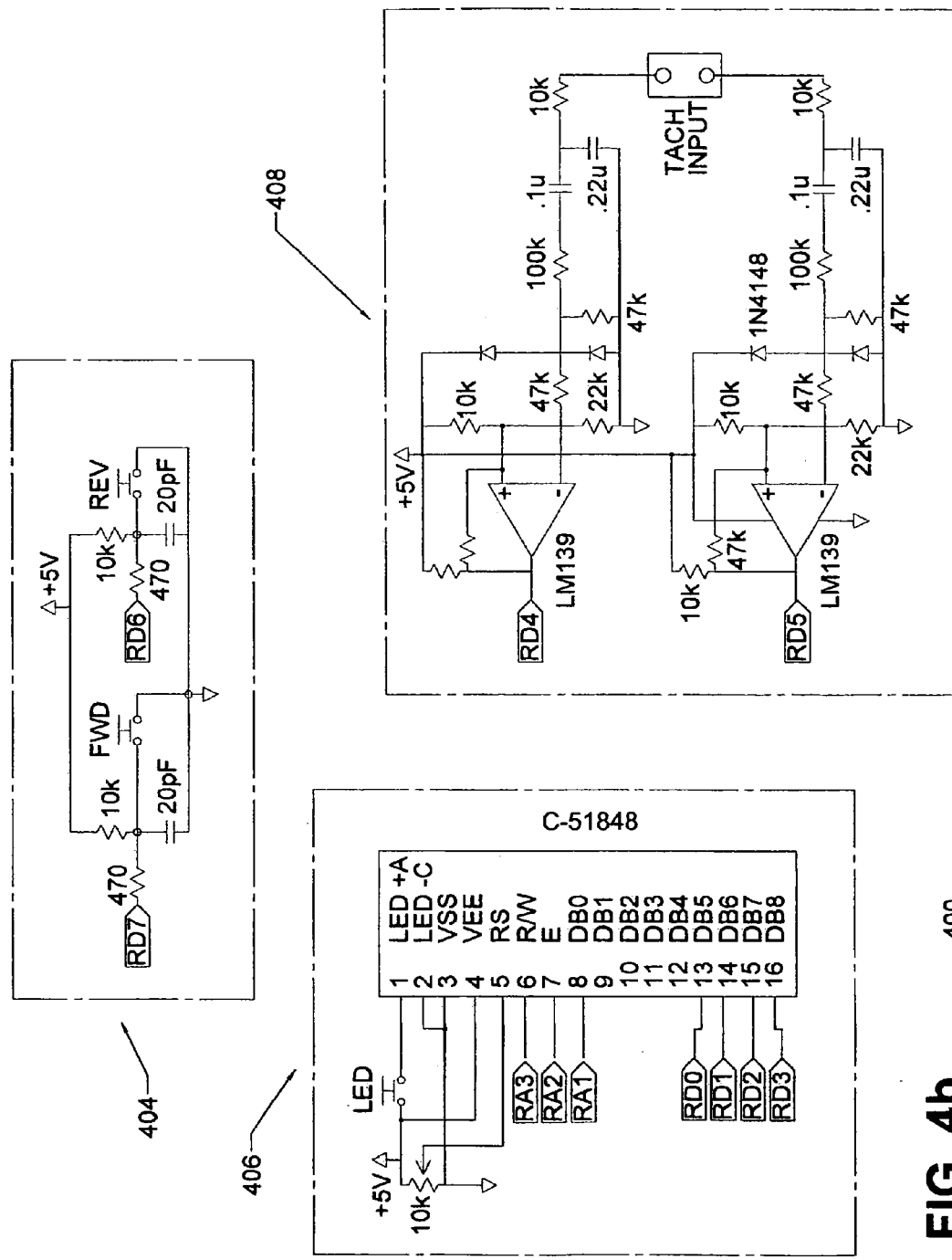

Referring now to FIG. 4, there is shown a schematic circuit diagram for a controller of a system according to the present invention. It will be readily understood that a controller can be implemented using numerous alternative electronic devices including, without limitation, discrete components, specialized integrated circuits such as comparators, a microcontroller, or by using a conventional computer and software, and that the controller can use either analog or digital circuitry.

In a broad aspect, the specific controller embodiment 400 of FIGS. 4a/4b comprises interconnected sub-circuits for: processing conditioned tachometer signals and controlling an actuator stepper motor 402; for selecting forward or reverse marine engine operation 404; for displaying operating parameters to an operator 406; and for conditioning input tachometer signals 408. In more detail, the inputs from the master and slave engine sensors are received as tachometer inputs to sub-circuit 408, which filters the inputs to produce pulses corresponding to engine rotation. The filtered signals are received by the microcontroller sub-circuit 402, which is programmed to count the difference in pulses between the master and slave engines and to control the actuator stepper motor via the stepper motor driver integrated circuit (L6219) of sub-circuit 402, resulting in controlled movement of the linear actuator and thus the trim of the engine. In preferred embodiments, the control board is mounted on the dashboard where it receive power, such as a +12 V and ground supply, and tachometer signals.

The present apparatus and system has a number of advantages and benefits compared to certain devices of the prior art. The apparatus and system provide only limited authority of the throttle stroke, most preferably about 20% authority. It does not provide full throttle control but a throttle trim function only. There are certain situations during vessel operation where non-synchronous operation is desirable, such as evasive maneuvers where the difference in engine speed will assist in abrupt direction change of the vessel.

Additionally, the device can be readily configured, for example by programming the microcontroller, to operate only when turned on by the operator and to turn synchronization off when the engine speed drops below a predetermined minimum when synchronization is not necessary such as, for example, during docking maneuvers. The controller can also comprise a self-calibration function to accommodate diverse engine types. For example, the controller can be readily programmed to sample and calibrate to the idle speed of the instant engine. Such a facility is advantageous because, for example, the tachometer of a four cylinder, four-stroke engine running at 2000 rpm might yield a sensor signal of 1000 pulses per minute, while a four cylinder, two-stroke engine may yield 2000 pulses per minute.

In the most preferred embodiments, the controller comprises a feature programmed into the microcontroller that keeps the actuator towards the mid-point of its stroke. This is advantageous to avoid the actuator reaching the limits of its stroke, which would prevent further synchronization in one direction. An exemplary algorithm includes the steps of determining from the sensor inputs that the operator is changing the throttle positions to accelerate or decelerate, during which time the microcontroller adjusts the actuator towards the mid-point of its stroke. The limits of the actuator stroke can be detected from an increase in the current drawn as the actuator encounters resistance, or by using one or more switches positioned at the limits and/or midpoint of the actuator stroke. In the case a stepper motor, the midpoint can be determined by counting motor steps forwards and backwards.

The small package size and simplicity of interface allows this system to be applied to many marine applications. This system may also be applied to any multi-engine vessel, aircraft, or device where the engine control consists of a cable or similar actuation. Marine applications include but are not limited to inboard, inboard/outboard or outboard configurations that are 2, 3, 4, 6, or 8 cylinders, and to 2 and 4 cycle gasoline and diesel engines actuated with throttle cables or the like.

The apparatus and system of the present invention can be used as follows. During normal operation, the operator positions the throttle controls to accomplish the desired vessel speed. In a marine environment, the port and starboard throttles are maintained at similar displacements. With a predetermined maximum actuator movement, the slave engine cable length is trimmed to match the speed of the master and slave engines. Preferably about one-half inch trim movement is sufficient for engine synchronization under all desired conditions and allows for full engine authority by the operator through the total speed range. The present apparatus and system also allows the port and starboard throttle controls to remain side by side, a desirable parameter for the finicky operator.

While the invention has been described in connection with its preferred embodiments, it should be recognized that changes and modifications can be made therein without departing from the scope of the appended claims.

What is claimed is:

1. An apparatus for synchronizing two or more engines of a vehicle, the apparatus comprising:
   an actuator comprising a motor assembly operably connected to a shaft, the shaft having an axis and a distal end, the motor assembly capable of displacing the shaft along its axis;
   an elongate bracket comprising a proximal end mounted to said assembly, the bracket extending substantially adjacent to said axis and further comprising a distal end comprising a mounting for securing one end of a throttle cable;
   the bracket further comprising an elongate aperture extending substantially adjacent said axis;

and a coupling mounted to the distal end of the shaft, the coupling extending through said aperture for engaging a throttle plate.

2. The apparatus according to claim 1, wherein the actuator is a linear actuator and the shaft is substantially enclosed by a protective bellows.

3. The apparatus according to claim 1, wherein the motor is a step motor.

4. The apparatus according to claim 1, wherein the mounting is a throttle cable tube and the tube and shaft are substantially coaxial.

5. The apparatus according to claim 1, wherein the vehicle is a multi-engine boat or aircraft.

6. A system for synchronizing the rotational speeds of a plurality of engines of a vehicle, the system comprising:
   a master engine and at least one slave engine mounted to said vehicle each said engine comprising a rotational speed sensor;
   each said slave engine further comprising a throttle cable and a throttle plate for operating the engine, and a synchronizing assembly operably mounted to the throttle cable and the throttle plate, said synchronizing assembly comprising an actuator comprising a motor assembly operably connected to a shaft, the shaft having an axis and a distal end, the motor assembly capable of displacing the shaft along its axis,
   an elongate bracket comprising a proximal end mounted to said assembly, the bracket extending substantially adjacent to said axis and further comprising a distal end comprising a mounting for securing one end of a throttle cable;
   the bracket further comprising an elongate aperture extending substantially adjacent said axis;
   and a coupling mounted to the distal end of the shaft, the coupling extending through said aperture for engaging a throttle plate;
   said system further comprising a controller for comparing the output of the master engine sensor and the outputs of the sensors of the one or more slave engines to generate a difference signal for controlling the motor assembly of each slave engine apparatus within predetermined limits;
   whereby the rotational speed of each slave engine is synchronized to the rotational speed of the master engine when the rotational speeds of said master and slave engines are within a predetermined speed range.

7. The system according to claim 6, wherein the actuator is a linear actuator.

8. The system according to claim 6, wherein the motor is a step motor.

9. The system according to claim 6, wherein the controller is a microcontroller.

10. The system according to claim 6, wherein said predetermined limits provide limited authority of between about one-eighth inch and about one inch of shaft motion.

11. The system according to claim 6, wherein said predetermined limits provide limited authority of between about 5% and about 30% of total throttle stroke.

12. The system according to claim 11, wherein said predetermined limits provide limited authority of about 20% of total throttle stroke.

13. The system according to claim 6, wherein said sensors provide electronic pulses corresponding to engine rotation, and the controller comprises a counter for determining engine speed differences.

* * * * *